United States Patent
Küngas et al.

(10) Patent No.: US 12,288,913 B2
(45) Date of Patent: Apr. 29, 2025

(54) SOLID OXIDE CELL STACK WITH A PRESSURE DIFFERENCE BETWEEN ANODE AND CATHODE COMPARTMENTS

(71) Applicant: Haldor Topsøe A/S, Kgs. Lyngby (DK)

(72) Inventors: Rainer Küngas, Peetri (EE); Thomas Heiredal-Clausen, Birkerød (DK); Bengt Peter Gustav Blennow, Humlebæk (DK); Tobias Holt Nørby, Glostrup (DK); Jeppe Rass-Hansen, Copenhagen V (DK)

(73) Assignee: Topsoe A/S, Lyngby (DE)

( * ) Notice: Subject to any disclaimer, the term of this patent is extended or adjusted under 35 U.S.C. 154(b) by 502 days.

(21) Appl. No.: 17/640,001

(22) PCT Filed: Oct. 7, 2020

(86) PCT No.: PCT/EP2020/078152
§ 371 (c)(1),
(2) Date: Mar. 3, 2022

(87) PCT Pub. No.: WO2021/083625
PCT Pub. Date: May 6, 2021

(65) Prior Publication Data
US 2022/0328858 A1    Oct. 13, 2022

(30) Foreign Application Priority Data
Oct. 28, 2019 (EP) .................... 19205619

(51) Int. Cl.
*H01M 8/026* (2016.01)
*H01M 8/0228* (2016.01)
(Continued)

(52) U.S. Cl.
CPC ....... *H01M 8/2425* (2013.01); *H01M 8/0228* (2013.01); *H01M 8/0247* (2013.01);
(Continued)

(58) Field of Classification Search
CPC .. H01M 8/0247; H01M 8/0254; H01M 8/026; H01M 8/12; H01M 8/2425
See application file for complete search history.

(56) References Cited

U.S. PATENT DOCUMENTS

| | | |
|---|---|---|
| 6,902,840 B2 | 6/2005 | Blanchet et al. |
| 2003/0096147 A1 | 5/2003 | Badding et al. |

(Continued)

FOREIGN PATENT DOCUMENTS

| | | | |
|---|---|---|---|
| CN | 103636044 A | 3/2014 | |
| EP | 3376575 A1 * | 9/2018 | ............. B21D 13/10 |

(Continued)

OTHER PUBLICATIONS

Minh, "Innovative Versatile and Cost-Effective SOFC Stack Concept Project," 20th Annual Solid Oxide Fuel Cell Project Review Meeting (Year: 2019).*

(Continued)

*Primary Examiner* — Kevin E Yoon
(74) *Attorney, Agent, or Firm* — Blank Rome LLP

(57) ABSTRACT

A SOC stack has interconnects with a maximum distance between the contact points which are designed to compensate for pressure difference between one side of the interconnect to the other side.

20 Claims, 1 Drawing Sheet

(51) Int. Cl.
*H01M 8/0247* (2016.01)
*H01M 8/0254* (2016.01)
*H01M 8/04089* (2016.01)
*H01M 8/12* (2016.01)
*H01M 8/2425* (2016.01)

(52) U.S. Cl.
CPC ......... *H01M 8/0254* (2013.01); *H01M 8/026* (2013.01); *H01M 8/04104* (2013.01); *H01M 8/12* (2013.01); H01M 2008/1293 (2013.01); H01M 2300/0071 (2013.01)

(56) References Cited

U.S. PATENT DOCUMENTS

| | | |
|---|---|---|
| 2007/0072043 A1 | 3/2007 | Badding et al. |
| 2007/0087256 A1 | 4/2007 | Hirashige et al. |
| 2008/0199738 A1* | 8/2008 | Perry .................. B22F 7/04 429/444 |
| 2011/0027683 A1 | 2/2011 | Ortiz |
| 2014/0212784 A1 | 7/2014 | Okuyama et al. |
| 2015/0218713 A1 | 8/2015 | Laucournet et al. |
| 2018/0323448 A1* | 11/2018 | Manabe .............. H01M 8/0265 |

FOREIGN PATENT DOCUMENTS

| | | |
|---|---|---|
| JP | H10154519 A | 6/1998 |
| JP | 2015537329 A | 12/2015 |
| WO | WO 2014/177213 A1 | 11/2014 |

OTHER PUBLICATIONS

Office Action issued Dec. 23, 2024 in corresponding Japanese Patent Application No. 2022-516695.

* cited by examiner

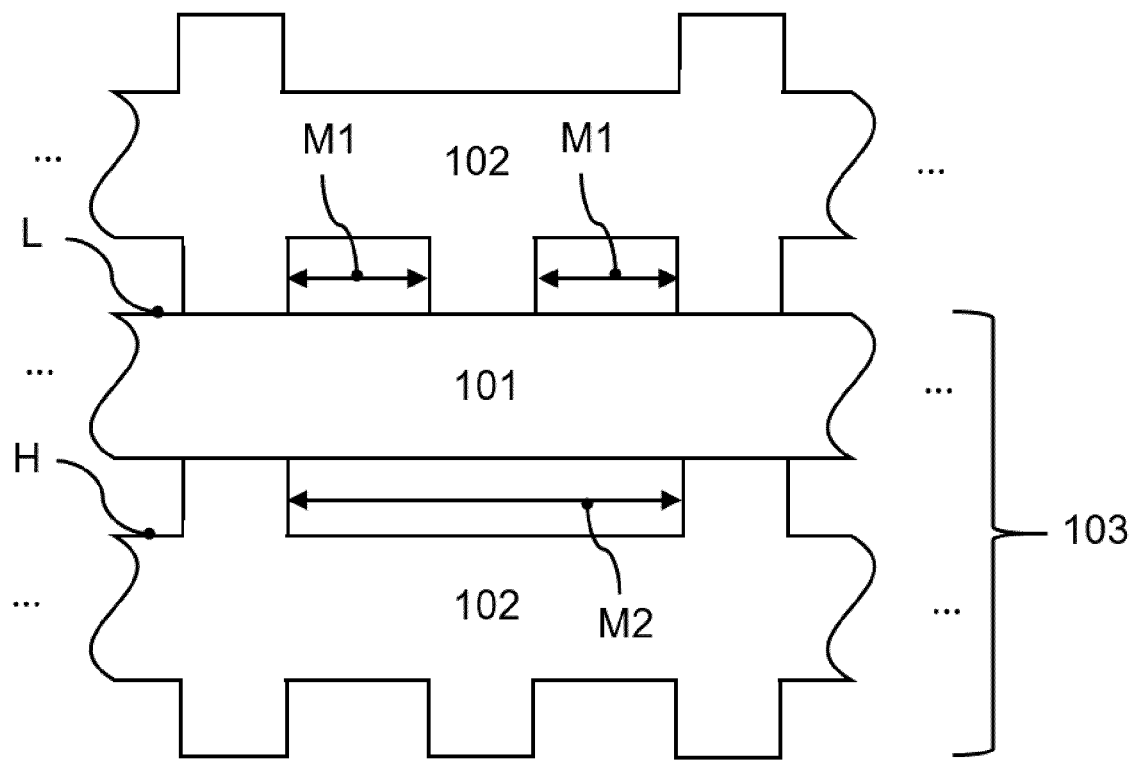

SOLID OXIDE CELL STACK WITH A PRESSURE DIFFERENCE BETWEEN ANODE AND CATHODE COMPARTMENTS

FIELD OF THE INVENTION

The invention relates to a solid oxide cell (SOC) stack, in particular a solid oxide fuel cell (SOFC) unit or a solid oxide electrolysis cell (SOEC) unit, in particular for a SOC stack with a pressure difference between the fuel-compartments of the SOC units and the oxy-compartments of the SOC units stacked upon each other to form a SOC stack.

BACKGROUND OF THE INVENTION

The invention proposes a design for a solid oxide cell (SOC) stack that is mechanically robust towards operation with a pressure difference between the fuel- and oxy-compartments of the stack. This is achieved by choosing the distance between contact points/ribs on the low-pressure side of the SOC such that the maximum tensile stress experienced by the SOC due to the applied pressure difference between the two sides of the cell is significantly below the Weibull strength of the SOC.

Solid oxide cells (SOC) typically comprise of layers of ceramic and metal-ceramic composite (cermet) materials. Regardless of the chosen cell geometry (tubular, planar, integrated planar, etc.), one of the cell layers is typically considerably thicker than other layers and provides mechanical support for the thinner layers. For example, in electrolyte-supported cells, a gas-tight electrolyte layer (consisting, e.g. of stabilized zirconia or doped ceria) is typically the thickest layer in the cell. The mechanical strength of such a cell is determined by the properties of electrolyte. In fuel-electrode supported cells, the fuel-electrode is the thickest layer in the cell and the mechanical properties of the cell are determined by the fuel-electrode. The fuel-electrode is typically a cermet material, comprising metallic Ni and an oxygen ion-conducting material, such as stabilized zirconia or doped ceria. Due to the use of ceramic materials, SOCs are brittle. A material is considered brittle, if, when subjected to stress, it fractures or fails with little or no plastic deformation. A ductile material, in contrast, is able to undergo significant plastic deformation before rupture, when subjected to stress.

To increase the output of an SOC unit, several SOCs are connected in series to form an SOC stack. The mechanical failure of a single SOC in a stack usually leads to the failure of the entire stack. The higher the number of cells in a stack, the lower the allowable failure rate of cells. For example, if the cell failure rate is 1/1000, then the corresponding stack failure rate is 1/100 for a 10-cell stack, but 1/10 for 100-cell stack. In order to achieve a low cell failure rate, the strength of the cell, characterized typically in terms of Weibull strength and Weibull modulus, should be maximized. It should be understood that the strength of ceramic materials is not an intrinsic property, but depends on the size and distribution of flaws, which arise during the manufacturing process and act as stress concentrators. As a result, the probability of failure of such samples is statistically distributed and is commonly characterized using the Weibull distribution. The Weibull distribution quantifies the variability of the strength of the samples resulting from a distribution of flaw sizes. According to the distribution, the probability of failure, $P_f$ is given as $$P_f = 1 - \exp[-(\sigma/\sigma_0)^m],$$

where $\sigma$ is the applied stress, $\sigma_0$ is the Weibull strength, and m is the Weibull modulus. Weibull strength and Weibull modulus can be estimated using a number of methods, such as ball-on-ring, 4-point-bending, ring-on-ring, etc.

During operation, solid oxide cells are fed with reactant gases. For example, when SOC is operating in solid oxide fuel cell mode, the fuel-side of the SOC could be fed with a fuel, such as hydrogen, methane, natural gas, syngas, etc., and the oxy-side of the SOC could be fed with an oxidant, such as air. When SOC is operating in solid oxide electrolysis mode, the fuel-side of the SOC could be fed with e.g. steam and/or carbon dioxide, while a flush gas, such as oxygen, steam, nitrogen or carbon dioxide could be fed to the oxy-side.

The pressure of gases on each side of the SOC can, in principal, be chosen freely. However, due to the brittleness of SOCs, it is common practice in the field to completely avoid pressure differences from occurring during operation. However, operation of SOC stacks with a non-zero pressure difference between the fuel- and oxy-side of the stack, if possible, would have significant advantages.

For example, U.S. Pat. No. 6,902,840 B2 teaches that it is desirable to minimize the pressure differential of the gases passing through the anode and cathode sides of the stacks and proposes the use of a mixer/educator to operate and mix said exhaust fuel gas and supply of oxidant gas such that the difference between the pressure of said exhaust fuel gas at the exit of the anode-side and the pressure of the oxidant gas at the inlet of the cathode-side is reduced.

In another example, US 2011/0027683 A1 proposes the use of seal materials with serpentine seal geometry to avoid seal failure, electrolyte failure (stress induced fracturing of electrolyte sheet wrinkles, buckling or corrugation), or device failure due to differential gas pressure and interactions between the device, the seal and the cell support frame.

SUMMARY OF THE INVENTION

Now, it has turned out that it is possible to operate an SOC stack with a pressure difference between the fuel- and oxy-side of the stack by providing sufficient mechanical support to the low-pressure side of the SOC. More specifically, the invention proposes a stack design, where the distance between contact points/ribs on the low-pressure side of the SOC are chosen such that the maximum tensile stress experienced by the SOC due to the applied pressure difference between the two sides of the cell is significantly below the Weibull strength of the SOC.

Being able to operate an SOC stack with either a steady-state or transient pressure difference between the fuel- and oxy-compartments has several advantages.

Transient pressure differences between the compartments can occur during stack operation, e.g. when the flow rates are changed or when a blower/compressor is started/stopped. A stack design that is robust towards such transient pressure differences would allow cheaper pressure control equipment to be used for monitoring/controlling the inlet pressures for oxy- and fuel compartments. Additionally, the invention would minimize the need for buffer tanks (e.g. for steam), which are often used to smoothen out transient pressure differences.

In solid oxide electrolysis mode, the fuel-side feed gas (for example steam, $CO_2$, or a mixture of thereof) is typically provided in pressurized state and the resulting product ($H_2$, CO, or syngas) should be pressurized. It is therefore desirable to operate the fuel-side compartment of the stack at an elevated pressure to avoid both an additional decompression of gases prior to entering the stack and a recompression of product gases after leaving the stack. According to the state-of-the-art, this implies that the oxy-side compartment of the stack needs to be pressurized to the same pressure as the fuel-side compartment. Hence, an additional compressor is needed for pressurizing the oxy-side gas prior to entering the stack. The proposed invention would eliminate the need for the oxy-side compressor and would thus involve significant cost savings, both in CAPEX and OPEX. Additionally, in a stack built according to the invention, the inlet pressures of the oxy- and fuel-side gases need not be matched exactly, which simplifies the system design and eliminates the need for buffer tanks.

In solid oxide fuel cell mode, the fuel-side feed gas (e.g. $H_2$, $CH_4$, natural gas, etc.) is often provided in pressurized state and the one (the other product being electricity) resulting product gas ($CO_2$, steam) can be advantageously used to drive a gas turbine, if pressurized. It is therefore desirable to operate the fuel-side compartment of the stack at an elevated pressure to avoid both an additional decompression of gases prior to entering the stack and a recompression of product gases after leaving the stack. According to the state-of-the-art, this implies that the oxy-side compartment of the stack needs to be pressurized to the same pressure as the fuel-side compartment. Hence, an additional compressor is needed for pressurizing the oxy-side gas prior to entering the stack. The proposed invention would eliminate the need for the oxy-side compressor and would thus involve significant cost savings, both in CAPEX and OPEX.

More specifically, the present invention solves the above discussed problems according to the claims by providing a Solid Oxide Cell stack comprising a plurality of stacked cell units as known in the art. Each unit comprises a solid oxide cell in a cell layer and an interconnect in an interconnect layer. One interconnect layer separates one cell unit from the adjacent cell unit in the cell stack and thus provides a gas barrier between the cell units. The interconnect also serves the purpose of providing gas flow channels and electrical contact between the cell units. This is solved by each interconnect comprising one or more protruding contact areas on a first side and one or more protruding contact areas on a second side of the interconnect adapted to provide mechanical and electrical contact between interconnects and solid oxide cells as well as gas flow channels in between the contact areas on both the first and the second side of the interconnect. It is to be understood that the contact areas on both sides of each interconnect protrudes at least relative to the bottom part of the gas flow channels. Particular for this invention, each solid oxide cell has a high-pressure side facing the first side of an adjacent interconnect and a low-pressure side facing a second side of an adjacent interconnect. The maximum distance between two adjacent edges of the contact areas on the second side of the interconnects is 2.5 mm, whereby also the tensile stress experienced by the SOC due to the applied pressure difference between the first and the second side of the interconnect also has a maximum which is related to the applied pressure and the distance between the two adjacent edges of the contact areas.

Hence, for a given SOC unit with given strength and for given operation condition, the interconnect is according to this invention designed to provide a maximum tensile stress experienced by the SOC by means of a maximum distance between two adjacent edges of the contact areas on the second side of the interconnects. Accordingly, in further embodiments of the invention, with different applications regarding SOC strength and/or pressure difference, said maximum difference can be 0.3 mm, 0.4 mm, 0.5 mm, 0.6 mm, 0.7 mm, 0.8 mm, 0.9 mm, 1.0 mm, 1.2 mm, 1.5 mm, 1.8 mm or 2.5 mm depending on the mentioned operation conditions and SOC strength.

According to another embodiment of the invention, the discussed maximum distance between two adjacent edges of the contact areas on the first side of the interconnects is the same or larger than the maximum distance between two adjacent edges of the contact areas on the second side of the interconnects. In this manner, the interconnect design may be tailored to the different process parameters and tensile stress which are at either side of the interconnect. I.e. the distance between two adjacent edges of the contact areas on one side is suited for the pressure and thus the stress on that side whereas the pressure and stress on the other side may be different and the discussed distance on that side may therefore also differ to meet the strength demands.

In a further embodiment of the invention, the interconnects of the SOC stack each has an area of between 15 $cm^2$ and 10000 $cm^2$, preferably between 64 and 500 $cm^2$.

The cell units may be ceramic in an embodiment of the invention. Also, the interconnects may comprise one or more intermediate contact enhancing layers. In a particular embodiment of the invention, the SOC stack is a Solid Oxide Electrolysis cell stack.

According to an embodiment of the invention, the pressure difference between the high-pressure side and the low-pressure side is minimum 300 mBar. In a further embodiment of the invention, said pressure difference is minimum 1 Bar, preferably minimum 5 Bar or even minimum 15 Bar. It is to be understood that the maximum distance between two adjacent edges of the contact areas on the second side of the interconnects may vary accordingly such that the higher the pressure difference, the smaller the maximum distance between two adjacent edges of said contact areas.

FEATURES OF THE INVENTION

1. Solid Oxide Cell stack comprising a plurality of stacked cell units, each unit comprises a solid oxide cell in a cell layer and an interconnect in an interconnect layer, wherein one interconnect layer separates one cell layer from the adjacent cell layer in the cell stack, each interconnect comprises one or more protruding contact areas on a first side and one or more protruding contact areas on a second side of the interconnect adapted to provide mechanical and electrical contact between interconnects and solid oxide cells,
wherein each solid oxide cell has a high-pressure side facing the first side of an adjacent interconnect and a low-pressure side facing a second side of an adjacent interconnect and wherein the maximum distance between two adjacent edges of the contact areas on the second side of the interconnects is 2.5 mm.

2. Solid Oxide Cell stack according to feature 1, wherein the maximum distance between two adjacent edges of the contact areas on the second side of the interconnects is 2.0 mm.

3. Solid Oxide Cell stack according to feature 1, wherein the maximum distance between two adjacent edges of the contact areas on the second side of the interconnects is 1.8 mm.

4. Solid Oxide Cell stack according to feature 1, wherein the maximum distance between two adjacent edges of the contact areas on the second side of the interconnects is 1.5 mm.

5. Solid Oxide Cell stack according to feature 1, wherein the maximum distance between two adjacent edges of the contact areas on the second side of the interconnects is 1.2 mm.

6. Solid Oxide Cell stack according to feature 1, wherein the maximum distance between two adjacent edges of the contact areas on the second side of the interconnects is 1.0 mm.

7. Solid Oxide Cell stack according to feature 1, wherein the maximum distance between two adjacent edges of the contact areas on the second side of the interconnects is 0.9 mm.

8. Solid Oxide Cell stack according to feature 1, wherein the maximum distance between two adjacent edges of the contact areas on the second side of the interconnects is 0.8 mm.

9. Solid Oxide Cell stack according to feature 1, wherein the maximum distance between two adjacent edges of the contact areas on the second side of the interconnects is 0.7 mm.

10. Solid Oxide Cell stack according to feature 1, wherein the maximum distance between two adjacent edges of the contact areas on the second side of the interconnects is 0.6 mm.

11. Solid Oxide Cell stack according to feature 1, wherein the maximum distance between two adjacent edges of the contact areas on the second side of the interconnects is 0.5 mm.

12. Solid Oxide Cell stack according to feature 1, wherein the maximum distance between two adjacent edges of the contact areas on the second side of the interconnects is 0.4 mm.

13. Solid Oxide Cell stack according to feature 1, wherein the maximum distance between two adjacent edges of the contact areas on the second side of the interconnects is 0.3 mm.

14. Solid Oxide Cell stack according to any of the preceding features, wherein the maximum distance between two adjacent edges of the contact areas on the first side of the interconnects is the same or larger than the maximum distance between two adjacent edges of the contact areas on the second side of the interconnects.

15. Solid Oxide Cell stack according to any of the preceding features, wherein the area of each of the interconnects is between 15 $cm^2$ and 10000 $cm^2$, preferably between 64 and 500 $cm^2$.

16. Solid Oxide Cell stack according to any of the preceding features, wherein the solid oxide cells are ceramic cells.

17. Solid Oxide Cell stack according to any of the preceding features, wherein the interconnects comprise one or more intermediate contact enhancing layers.

18. Solid Oxide Cell stack according to any of the preceding features, wherein the Solid Oxide Cell stack is a Solid Oxide Electrolysis cell stack.

19. Solid Oxide Cell stack according to any of the preceding features, wherein the pressure difference between the high-pressure side and the low-pressure side is minimum 300 mBar.

20. Solid Oxide Cell stack according to any of the preceding features, wherein the pressure difference between the high-pressure side and the low-pressure side is minimum 1 Bar, preferably minimum 5 Bar, preferably minimum 15 Bar.

21. Solid Oxide Cell stack according to any of the preceding features, wherein the high-pressure side is a fuel-side.

DRAWING

In the following an embodiment of the invention will be explained with reference to FIG. 1, which shows a partial principle side cut of a part of an SOC stack according to an embodiment of the invention.

A part of an Solid Oxide Cell (SOC) 101 is shown with a high pressure side, H and a low pressure side L. It is to be understood that several SOCs are stacked in layers in the SOC stack, with Interconnects, 102 separating each SOC from the next in the cell stack. An SOC and one interconnect each forming a cell unit 103. The high pressure side of the SOC faces a first side of an interconnect and the low pressure side of the SOC faces a second side of the interconnect. The interconnects comprise protruding contact areas on both the first and the second side of the interconnect. According to the invention, the maximum distance between two adjacent edges of the contact areas on the second side of each interconnect M1, is adapted be 2.5 mm, to support the cell unit. The distance M2 between two adjacent edges of the contact areas on the first side of each interconnect may in an embodiment of the invention be larger than M1, since the high pressure side of the SOC needs less support than the low pressure side. In a further embodiment of the invention, the high pressure side of the SOC is the fuel side of the SOC.

EXAMPLES

The design of the invention was tested in two short SOC stacks containing 9 single repeat cell units. The distance between the contact points/ribs on the low pressure oxy side was 1.3 mm, and the fuel side was pressurized up to 1.75 bara yielding a pressure difference from fuel to oxy side of up to 750 mbar.

The first test was performed in electrolysis mode, with fuel containing 5% hydrogen in steam. The oxy side was flushed with air and kept at ambient pressure (1.013 bara) throughout the test. The inlet gases were heated to 750° C. and the stack was installed in a furnace keeping the temperature around the stack stable at 750° C. The stack was run at a current density of approximately 0.75 A/cm2. Below is a table showing the average cell voltage at the chosen operating point with increasing fuel side pressure.

| Fuel side pressure [bara] | Pressure difference [mbar] | Average cell voltage [mV] |
|---|---|---|
| 1.02 | 8 | 1255 |
| 1.26 | 250 | 1253 |
| 1.51 | 495 | 1248 |
| 1.76 | 742 | 1241 |

As seen from the table, the average voltage of the cells decreases as the fuel side pressure increases, which in SOEC mode corresponds to improved performance. The increased performance at this operating point corresponds to a reduced power consumption of a little more than 1%.

The second test was performed in SOFC mode on a fuel of 60% hydrogen and 40% nitrogen. Again, the oxy side was flushed with air and kept at ambient pressure (1.013 bara) throughout the test. The inlet gases were heated to 700° C. and the SOC stack was installed in a furnace keeping the temperature around the SOC stack stable at 700° C. The SOC stack was run at a current density of approximately 0.28 A/cm2. Below is a table showing the average cell voltage at the chosen operating point with increasing fuel side pressure.

| Fuel side pressure [bara] | Pressure difference [mbar] | Average cell voltage [mV] |
|---|---|---|
| 1.01 | 0 | 874.7 |
| 1.26 | 243 | 877.2 |
| 1.51 | 492 | 878.5 |
| 1.75 | 740 | 879.5 |

As seen from the table, the average voltage of the cells increases as the fuel side pressure increases, which in SOFC mode corresponds to improved performance. The increased performance at this operating point corresponds to an increase in power output of roughly 0.6%.

What is claimed is:

1. Solid Oxide Cell stack, comprising
a plurality of stacked cell units, each unit comprises a solid oxide cell in a cell layer and an interconnect in an interconnect layer,
wherein one interconnect layer separates one cell layer from the adjacent cell layer in the cell stack, each interconnect comprises one or more protruding contact areas on a first side and one or more second protruding contact areas on a second side of the interconnect adapted to provide mechanical and electrical contact between the solid oxide cells,
wherein each solid oxide cell has a high-pressure side facing the first side of an adjacent interconnect and a low-pressure side facing a second side of an adjacent interconnect and
wherein a maximum distance between two adjacent edges of the contact areas on the first side of the interconnects is larger than the maximum distance between two adjacent edges of the contact areas on the second side of the interconnects, and
wherein the maximum distance between the two adjacent edges of the contact areas on the second side of the interconnects does not exceed 2.5 mm.

2. Solid Oxide Cell stack according to claim 1, wherein the maximum distance between two adjacent edges of the contact areas on the second side of the interconnects is 2.0 mm.

3. Solid Oxide Cell stack according to claim 1, wherein the maximum distance between two adjacent edges of the contact areas on the second side of the interconnects is 1.8 mm.

4. Solid Oxide Cell stack according to claim 1, wherein the maximum distance between two adjacent edges of the contact areas on the second side of the interconnects is 1.5 mm.

5. Solid Oxide Cell stack according to claim 1, wherein the maximum distance between two adjacent edges of the contact areas on the second side of the interconnects is 1.2 mm.

6. Solid Oxide Cell stack according to claim 1, wherein the maximum distance between two adjacent edges of the contact areas on the second side of the interconnects is 1.0 mm.

7. Solid Oxide Cell stack according to claim 1, wherein the maximum distance between two adjacent edges of the contact areas on the second side of the interconnects is 0.9 mm.

8. Solid Oxide Cell stack according to claim 1, wherein the maximum distance between two adjacent edges of the contact areas on the second side of the interconnects is 0.8 mm.

9. Solid Oxide Cell stack according to claim 1, wherein the maximum distance between two adjacent edges of the contact areas on the second side of the interconnects is 0.7 mm.

10. Solid Oxide Cell stack according to claim 1, wherein the maximum distance between two adjacent edges of the contact areas on the second side of the interconnects is 0.6 mm.

11. Solid Oxide Cell stack according to claim 1, wherein the maximum distance between two adjacent edges of the contact areas on the second side of the interconnects is 0.5 mm.

12. Solid Oxide Cell stack according to claim 1, wherein the maximum distance between two adjacent edges of the contact areas on the second side of the interconnects is 0.4 mm.

13. Solid Oxide Cell stack according to claim 1, wherein the maximum distance between two adjacent edges of the contact areas on the second side of the interconnects is 0.3 mm.

14. Solid Oxide Cell stack according to claim 1, wherein an area of each of the interconnects is between 15 cm$^2$ and 10000 cm$^2$.

15. Solid Oxide Cell stack according to claim 1, wherein the solid oxide cells are ceramic cells.

16. Solid Oxide Cell stack according to claim 1, wherein the interconnects comprise one or more intermediate contact enhancing layers.

17. Solid Oxide Cell stack according to claim 1, wherein the Solid Oxide Cell stack is a Solid Oxide Electrolysis cell stack.

18. Solid Oxide Cell stack according to claim 1, wherein the pressure difference between the high-pressure side and the low-pressure side is minimum 300 mBar.

19. Solid Oxide Cell stack according to claim 1, wherein the pressure difference between the high-pressure side and the low-pressure side is minimum 1 Bar.

20. Solid Oxide Cell stack according to claim 1, wherein at least one of the first protruding contact areas aligns with at least one of the second protruding contact areas.

* * * * *